(12) United States Patent
Hardy et al.

(10) Patent No.: US 9,635,391 B1
(45) Date of Patent: Apr. 25, 2017

(54) TRAFFIC SYSTEM AND METHOD FOR PLACING ADVERTISEMENTS WITH CONTENT BROADCAST NETWORKS

(71) Applicant: Visual Advertising Sales Technology, Grass Valley, CA (US)

(72) Inventors: David S. Hardy, Grass Valley, CA (US); Mark T. Elmasri, Yelm, WA (US); Asif Abdul Muneer Balgar, Dona Paula (IN)

(73) Assignee: Visual Advertising Sales Technology, Green Valley, CA (US)

( * ) Notice: Subject to any disclaimer, the term of this patent is extended or adjusted under 35 U.S.C. 154(b) by 0 days.

(21) Appl. No.: 15/168,469

(22) Filed: May 31, 2016

(51) Int. Cl.
| | |
|---|---|
| *H04N 5/445* | (2011.01) |
| *H04N 21/234* | (2011.01) |
| *H04N 21/81* | (2011.01) |
| *H04N 21/436* | (2011.01) |
| *H04N 21/4786* | (2011.01) |
| *H04L 12/58* | (2006.01) |
| *G06F 17/30* | (2006.01) |

(52) U.S. Cl.
CPC ... *H04N 21/23424* (2013.01); *G06F 17/3082* (2013.01); *H04L 51/08* (2013.01); *H04N 21/436* (2013.01); *H04N 21/4786* (2013.01); *H04N 21/812* (2013.01)

(58) Field of Classification Search
CPC .......... H04N 21/234; H04N 21/23424; H04N 21/237; H04N 21/2665
See application file for complete search history.

(56) References Cited

U.S. PATENT DOCUMENTS

| | | | | | |
|---|---|---|---|---|---|
| 5,260,778 | A | * | 11/1993 | Kauffman | H04N 21/812 348/468 |
| 5,717,923 | A | * | 2/1998 | Dedrick | G06F 17/30702 |
| 5,774,170 | A | * | 6/1998 | Hite | G06Q 30/02 348/E7.036 |
| 5,937,331 | A | * | 8/1999 | Kalluri | H04N 7/088 348/478 |
| 6,075,551 | A | * | 6/2000 | Berezowski | H04N 5/44543 348/722 |
| 6,487,721 | B1 | * | 11/2002 | Safadi | H04N 7/165 375/E7.023 |
| 6,698,020 | B1 | * | 2/2004 | Zigmond | H04N 5/44513 348/E5.102 |
| 9,060,200 | B1 | * | 6/2015 | Niemeijer | H04N 21/633 |
| 2002/0056107 | A1 | * | 5/2002 | Schlack | H04N 7/17318 725/46 |
| 2002/0061067 | A1 | * | 5/2002 | Lyons | H04N 21/23406 375/240.27 |

(Continued)

*Primary Examiner* — Pankaj Kumar
*Assistant Examiner* — Timothy Newlin
(74) *Attorney, Agent, or Firm* — FisherBroyles, LLP; Rob L. Phillips

(57) ABSTRACT

A computer-implemented system and method for incorporating advertising breaks across one or more broadcast networks. The system and method involve gathering information from several different data files, analyzing the same, making real-time logic decisions and exporting a new data file that can be imported into a traffic system of the type used to manage the placement of advertisements/commercials in television programs including normalized break windows, break counts, inventory allocations and break sequences.

18 Claims, 8 Drawing Sheets

(56) References Cited

U.S. PATENT DOCUMENTS

| | | | | |
|---|---|---|---|---|
| 2002/0087976 A1* | 7/2002 | Kaplan | H04N 7/17336 | 725/34 |
| 2002/0184047 A1* | 12/2002 | Plotnick | G06Q 30/0258 | 705/1.1 |
| 2006/0287915 A1* | 12/2006 | Boulet | G06Q 30/02 | 705/14.61 |
| 2007/0055985 A1* | 3/2007 | Schiller | G06F 13/4027 | 725/34 |
| 2008/0189734 A1* | 8/2008 | Schepers | G06Q 10/0631 | 725/32 |
| 2009/0320063 A1* | 12/2009 | Barrett | H04N 21/23418 | 725/34 |
| 2013/0086607 A1* | 4/2013 | Tom | G06Q 30/0241 | 725/32 |
| 2013/0097629 A1* | 4/2013 | Popescu | H04N 21/23424 | 725/32 |
| 2014/0165095 A1* | 6/2014 | Miller | H04N 21/44016 | 725/34 |
| 2015/0172737 A1* | 6/2015 | Lechner | H04N 21/812 | 725/32 |

\* cited by examiner

| Preview Schout Export | | | | | | | |
|---|---|---|---|---|---|---|---|
| Network: | AEN | Arts & Entertainment | | | | | ☒ Close |
| Date: | 03/09/15 | | | | | | |

| Break Window Open | Break Window Close | Break Time | Break Length | Break Number | Slot Position | Slot Length | Inventory Type |
|---|---|---|---|---|---|---|---|
| 00:15 | 00:16 | 00:15 | 60 | 1 | 1 | 60 | Default (unallocated) Inventory |
| 00:45 | 00:46 | 00:45 | 60 | 2 | 1 | 30 | CT Regional Marketing |
|  |  |  |  |  | 2 | 30 | Default (unallocated) Inventory |
| 01:15 | 01:16 | 01:15 | 60 | 3 | 1 | 60 | Default (unallocated) Inventory |
| 01:45 | 01:46 | 01:45 | 60 | 4 | 1 | 30 | CT Regional Marketing |
|  |  |  |  |  | 2 | 30 | Default (unallocated) Inventory |
| 02:15 | 02:16 | 02:15 | 60 | 5 | 1 | 60 | Default (unallocated) Inventory |
| 02:45 | 02:46 | 02:45 | 60 | 6 | 1 | 60 | Default (unallocated) Inventory |
| 03:29 | 03:30 | 03:29 | 60 | 7 | 1 | 60 | Default (unallocated) Inventory |
| 03:59 | 04:00 | 03:59 | 60 | 8 | 1 | 30 | CT Regional Marketing |
|  |  |  |  |  | 2 | 30 | Default (unallocated) Inventory |
| 04:29 | 04:30 | 04:29 | 60 | 9 | 1 | 60 | Default (unallocated) Inventory |
| 04:59 | 05:00 | 04:59 | 60 | 10 | 1 | 60 | Default (unallocated) Inventory |
| 05:29 | 05:30 | 05:29 | 60 | 11 | 1 | 30 | CT Regional Marketing |
|  |  |  |  |  | 2 | 30 | Default (unallocated) Inventory |
| 05:59 | 06:00 | 05:59 | 60 | 12 | 1 | 60 | Default (unallocated) Inventory |
| 06:15 | 06:16 | 06:15 | 60 | 13 | 1 | 30 | CT Regional Marketing |
|  |  |  |  |  | 2 | 30 | Default (unallocated) Inventory |
| 06:45 | 06:46 | 06:45 | 60 | 14 | 1 | 60 | Default (unallocated) Inventory |
| 07:15 | 07:16 | 07:15 | 60 | 15 | 1 | 60 | Default (unallocated) Inventory |
| 07:45 | 07:46 | 07:45 | 60 | 16 | 1 | 30 | CT Regional Marketing |
|  |  |  |  |  | 2 | 30 | Default (unallocated) Inventory |
| 08:15 | 08:16 | 08:15 | 60 | 17 | 1 | 60 | Default (unallocated) Inventory |
| 08:45 | 08:46 | 08:45 | 60 | 18 | 1 | 60 | Default (unallocated) Inventory |
| 09:15 | 09:16 | 09:15 | 60 | 19 | 1 | 30 | CT Regional Marketing |
|  |  |  |  |  | 2 | 30 | Default (unallocated) Inventory |
| 09:45 | 09:46 | 09:45 | 60 | 20 | 1 | 60 | Default (unallocated) Inventory |

FIG. 5A

| Preview Schout Export | | | | | | | | |
|---|---|---|---|---|---|---|---|---|
| Network: AEN \| Arts & Entertainment | | | | | | | | |
| Date: 03/09/15 | | | | | | | | |
| Break Window Open | Break Window Close | Break Time | Break Length | Break Number | Slot Position | Slot Length | Inventory Type | |
| 00:00 | 00:59 | 00:00 | 60 | 1 | 1 | 60 | Default (unallocated) Inventory | |
| 00:00 | 00:59 | 00:00 | 60 | | 2 | 30 | CT Regional Marketing | |
| 01:00 | 01:59 | 01:00 | 60 | 3 | 1 | 60 | Default (unallocated) Inventory | |
| 01:00 | 01:59 | 01:00 | 60 | 4 | 2 | 30 | CT Regional Marketing | |
| 02:00 | 02:59 | 02:00 | 60 | 5 | 1 | 60 | Default (unallocated) Inventory | |
| 02:00 | 02:59 | 02:00 | 60 | 6 | 1 | 60 | Default (unallocated) Inventory | |
| 03:00 | 03:29 | 03:00 | 60 | 7 | 1 | 60 | Default (unallocated) Inventory | |
| 03:30 | 03:59 | 03:30 | 60 | 8 | 1 | 60 | Default (unallocated) Inventory | |
| 04:00 | 04:29 | 04:00 | 60 | 9 | 1 | 30 | CT Regional Marketing | |
| 04:30 | 04:59 | 04:30 | 60 | 10 | 1 | 60 | Default (unallocated) Inventory | |
| 05:00 | 05:29 | 05:00 | 60 | 11 | 1 | 60 | Default (unallocated) Inventory | |
| 05:30 | 05:59 | 05:30 | 60 | 12 | 2 | 30 | CT Regional Marketing | |
| 06:00 | 06:29 | 06:00 | 60 | 13 | 1 | 60 | Default (unallocated) Inventory | |
| 06:30 | 06:59 | 06:30 | 60 | 14 | 1 | 60 | Default (unallocated) Inventory | |
| 07:00 | 07:29 | 07:00 | 60 | 15 | 1 | 60 | Default (unallocated) Inventory | |
| 07:30 | 07:59 | 07:30 | 60 | 16 | 1 | 60 | Default (unallocated) Inventory | |
| 08:00 | 08:59 | 08:00 | 60 | 17 | 1 | 60 | Default (unallocated) Inventory | |
| 08:00 | 08:59 | 08:00 | 60 | 18 | 2 | 30 | CT Regional Marketing | |
| 09:00 | 09:59 | 09:00 | 60 | 19 | 1 | 60 | Default (unallocated) Inventory | |
| 09:00 | 09:59 | 09:00 | 60 | 20 | 1 | 30 | CT Regional Marketing | |

```
CST_AEN 2_3.09.sfo Notepad
File Edit Format View Help
CULAEN2015030900000590015D011      0000000009999999999@LOCKED@006000000600000101
CULAEN2015030900000590015D021FAK990000000099999999999@LOCKED@003000000600000101
CULAEN2015030900000590015D022      0000000009999999999@LOCKED@003000000600000101
CULAEN2015030901000590015D031      0000000009999999999@LOCKED@006000000600000101
CULAEN2015030901000159015D041FAK990000000099999999999@LOCKED@003000000600000101
CULAEN2015030901000159015D042      0000000009999999999@LOCKED@003000000600000101
CULAEN2015030902000259021SD051     0000000009999999999@LOCKED@006000000600000101
CULAEN2015030902000259024D061FAK990000000099999999999@LOCKED@006000000600000101
CULAEN2015030903000329031SD071     0000000009999999999@LOCKED@006000000600000101
CULAEN2015030903000359034SD081     0000000009999999999@LOCKED@006000000600000101
CULAEN2015030904000429041SD091FAK990000000099999999999@LOCKED@003000000600000101
CULAEN2015030904000429041SD092     0000000009999999999@LOCKED@003000000600000101
CULAEN2015030904300459044SD101FAK990000000099999999999@LOCKED@006000000600000101
CULAEN2015030904300459044SD102     0000000009999999999@LOCKED@003000000600000101
CULAEN2015030905000529051SD111     0000000009999999999@LOCKED@003000000600000101
CULAEN2015030905300559054SD121FAK990000000099999999999@LOCKED@006000000600000101
CULAEN2015030905300559054SD122     0000000009999999999@LOCKED@003000000600000101
CULAEN2015030906000629061SD131     0000000009999999999@LOCKED@006000000600000101
CULAEN2015030906300659064SD141FAK990000000099999999999@LOCKED@006000000600000101
CULAEN2015030906300659064SD142     0000000009999999999@LOCKED@003000000600000101
CULAEN2015030907000729071SD151     0000000009999999999@LOCKED@003000000600000101
CULAEN2015030907300759074SD161     0000000009999999999@LOCKED@006000000600000101
CULAEN2015030908000829081SD171FAK990000000099999999999@LOCKED@006000000600000101
CULAEN2015030908300859084SD181     0000000009999999999@LOCKED@003000000600000101
CULAEN2015030909000929091SD191FAK990000000099999999999@LOCKED@003000000600000101
CULAEN2015030909000929091SD192     0000000009999999999@LOCKED@003000000600000101
CULAEN2015030909300959094SD201     0000000009999999999@LOCKED@006000000600000101
CULAEN2015030910001059101SD211FAK990000000099999999999@LOCKED@006000000600000101
CULAEN2015030910001059104SD221     0000000009999999999@LOCKED@006000000600000101
CULAEN2015030911001159111SD231     0000000009999999999@LOCKED@003000000600000101
CULAEN2015030911001159114SD241FAK990000000099999999999@LOCKED@006000000600000101
CULAEN2015030911001159114SD242     0000000009999999999@LOCKED@003000000600000101
CULAEN2015030912001259121SD251     0000000009999999999@LOCKED@003000000600000101
CULAEN2015030912001259124SD261FAK990000000099999999999@LOCKED@006000000600000101
```

520, 503

TRAFFIC SYSTEM AND METHOD FOR PLACING ADVERTISEMENTS WITH CONTENT BROADCAST NETWORKS

FIELD OF THE INVENTION

The embodiments of the present invention relate to a system and method for the placement of advertisements with content broadcast networks (e.g., Charter Cable®).

BACKGROUND

The business of placing local and regional ads on cable television is very complex requiring the handling of literally tens of millions of "available 30 second slots" per month in most major traffic systems. The current systems and methods that control the placement of commercials in these time slots are quite inefficient and inflexible relative to processing and handling data. For instance, the current systems and methods are based on the number of minutes in a 24 hour military clock wherein the first minute after midnight is designated as 00:01:00 through 24:00:00 (midnight). The national and regional cable networks (e.g., ESPN, TNT, A&E) air national and/or regional commercials that are non-pre-emptible and also deliver inaudible electronic "cue tones" that tell the local traffic computer servers ("call traffic system") to insert a local commercial at the time of the cue tones. Typically there are two to four 60 second cue tones per hour that are available into which the local traffic system may insert local commercials. Commercials typically are 30 seconds in length but can also be 15 seconds or 60 seconds in length.

Current systems and methods for the placement of advertisements with content broadcast networks tend to be inefficient and inflexible.

Thus, it would be advantageous to develop an efficient and flexible system and method for the placement of advertisements with content broadcast networks.

SUMMARY

The embodiments of the present invention are directed to a computer-implemented system and method for gathering information from several different data files, analyzing the same, making real-time logic decisions and exporting a new data file that can be imported into a traffic system of the type used to manage the placement of advertisements/commercials in television programs including normalized break windows, break counts, inventory allocations and break sequences via a standalone web-based system.

Advantageously, the system and method detailed herein modify the data without affecting the underlying traffic system operating system (e.g., Eclipse (Plus) Traffic System).

Other variations, embodiments and features of the present invention will become evident from the following detailed description, drawings and claims.

BRIEF DESCRIPTION OF THE DRAWINGS

FIGS. 5A-5D illustrate screen shots associated with a methodology according to the embodiments of the present invention.

DETAILED DESCRIPTION

Figure 1:
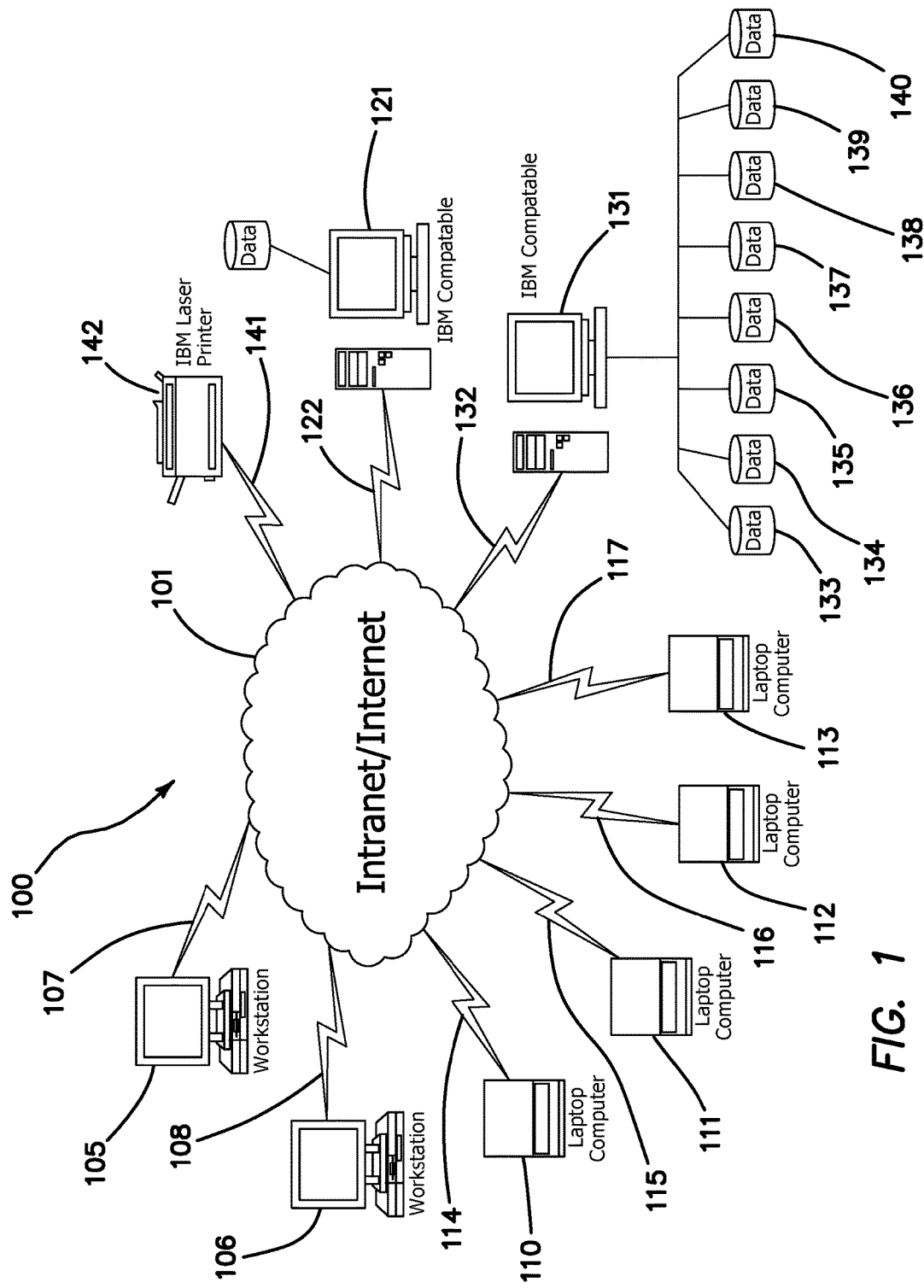
FIG. 1 illustrates a block diagram of network of an advertising/traffic system of the type utilized or encountered with the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "terminal" should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

FIG. 1 illustrates a network 100 that provides an advertising system in accordance with the embodiments of the present invention. Network 100 includes Internet or Intranet 101 that connects various processing systems in network 100 to allow the exchange of data between the processing systems. One skilled in the art will recognize that processing systems are personal computers, system computers, routers, or other devices that can process digital data.

In network 100, desktop computers 105-106 are connected to Internet/Intranet 101 via paths 107-108. Laptop computers 110-113 are connected to Internet/Intranet via paths 114-117. One skilled in the art will recognize that paths 107-108 and 114-117 may be telephone lines, Ethernet lines, or any other manner of connecting processing systems. One skilled in the art will also recognize that any number of processing units may be connected to Internet/Intranet 101.

Information server 121 is connected to Internet/Intranet 101 via path 122. Information server 121 is a router or other processing device that controls data transfers between processing systems connected to Internet/Intranet 101.

Database server 131 is connected to Internet/Intranet 101 via path 132. Database server is a processing system that maintains various databases that are accessed by the embodiments of the present invention. In network 100, database server 131 maintains programming database 133, promotions database 134, demographics database 135, client database 136, billing database 137, production database 139, inventory database 140 and message database 138.

Programming database 133 stores records for information about programs to be broadcast including time, length, and timeslots for advertisements. This information may compiled by an outside provider and the compiled information is used to populate the database. Promotions database 134 stores records containing information relating to pricing for timeslots and special offers on sales of time slots. Demographics database 135 stores records containing information related to ratings for broadcast programs and demographic information about viewers of the broadcast programs. Demographic information may come from a third party source. The demographics information from the third party source may be used to populate demographics database 135.

Client database 136 is a database that stores client information. The client information stored in client database 136 includes client contact information, target areas for the client, demographic groups the client desire to reach and desired rates for timeslots. The client information may also include past time slots that the client has purchased including the programming into which the timeslot is inserted. This information may either be provided by the client directly or an account executive may collect the information and input the information into the system.

Billing database 137 is a database that stores client account records that stores accounting information for sales of time slots. Billing database 137 may be a well-known accounting application, or may be a custom made accounting application for use in the system in accordance with the embodiments of the present invention.

Message database 138 is an e-mail or other message system that stores messages generated by the system for account executives. The messages may include reminders about promotions or programming that may be of interest to an account executive.

Production database 139 stores programming content to be broadcast. The programming content may include the insertions of advertisements into appropriate timeslots in the broadcast. Inventory database 140 may store the advertisements that various clients have produced for insertion into the programming content when a timeslot is purchased.

Network 100 may also have a printer 142 or other output device connected to Internet/Intranet 101 via path 141. Printer 142 prints either a screen or a document for permanent storage or for review by an account executive. Printer 142 is a standard printer that is common and well known in the art.

Figure 2:
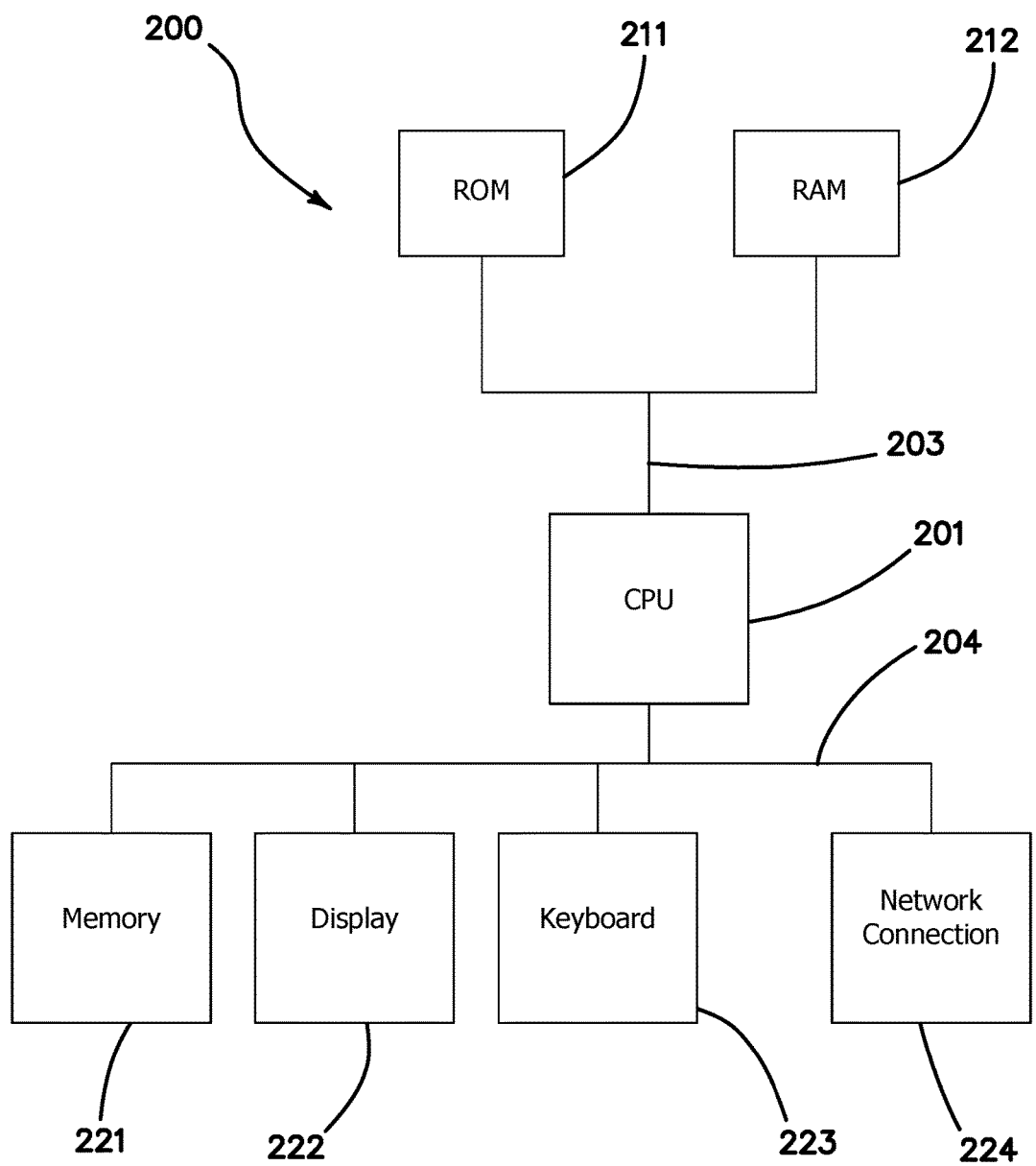
FIG. 2 illustrates a block diagram of a terminal of the network of FIG. 1 of the type utilized or encountered with the embodiments of the present invention.

FIG. 2 illustrates an exemplary embodiment of a processing system 200. One skilled in the art will recognize that each device connected to network 100 in FIG. 1 includes a processing system. However, the exact configuration and device connected to the processing system in each individual device in the network may vary.

Processing system 200 has a Central Processing Unit (CPU) 201. CPU 201 is a processor, microprocessor, or any combination of processors and microprocessor that execute instructions stored in memory to perform an application. CPU 201 is connected to a memory bus 203 and Input/Output (I/O) bus 204.

A non-volatile memory, such as Read Only Memory (ROM) 211, is connected to CPU 201 via memory bus 203. ROM 211 stores instructions for initialization and other system commands of processing system 200. One skilled in the art will recognize that any memory that cannot be written to by CPU 201 may be used for the functions of ROM 211.

A volatile memory such as Random Access Memory (RAM) 212 is also connected to CPU 201 via memory bus 204. RAM 212 stores instructions for all processes being executed and data operated upon by the executed processes. One skilled in the art will recognize that other types of memories such DRAM and SRAM may also be used as a volatile memory and that memory caches and other memory devices (Not shown) may be connected to memory bus 204.

Peripheral devices including, but not limited to, memory 221, display 222, I/O device 223, and network connection device 224 that are connected to CPU 201 via I/O bus 204. I/O bus 204 carries data between the device and CPU 201. Memory 201 is a device for storing data unto a media. Some examples of memory 221 include read/write compact discs (CDs), and magnetic disk drives. Display 222 is a monitor or display and associated drivers that convert data to a display. I/O device 223 is a keyboard, a pointing device or other device that may be used by a user to input data. Network device 224 is a modem or Ethernet "card" that connects processing system 200 to a network. One skilled in the art will recognize that exact configuration and devices connected to each processing system in network 100 may vary depending upon the operations that the processing system performs in the network.

The placement of local commercials or advertisements requires an external programming data feed 150 that informs the system/network 100, via the programming database 133, or other database, module or application of the system/network 100, regarding which shows, movies and/or sports events are scheduled to run at particular times during each broadcast day on each channel. Included in the programming data feed 150 are the expected times that each broadcast network intends to deliver the cue tones for local commercials. The expected times are delivered to the traffic system along with the "windows" of time that the traffic system needs to ensure the cue tones are each received and advertisements played correctly. The external source file received via the programming data feed 150 is normally referred to as a break structure file 155.

Entities providing services related to the placement of local commercials (and others) during television broadcasts (e.g., cable programming) are very limited. The method for placing such local commercials is well known and lacking in efficiencies and flexibility. Current methods are also labor intensive rendering the method more costly than necessary. The current method involves a computer-implemented system receiving Schout files (SFO) intended to communicate inventory between multiple organizations selling in the same "interconnected" market. An interconnected market may have sales and traffic commercial spot delivery geographies that encompass several different multiple system operators (MSO) owning cable properties that in combination may make up a Designated Market Area (DMA). Because each system owner has a right to a certain portion of the hourly inventory to sell, it is important that the break times and sequence be present in order to manage the commercial spots that air in different time slots.

Schout files (SFO, Schedule File Out) are an industry standard file structure and may include inventory allocations, break windows, break counts and break sequences but unfortunately the Schout files do not incorporate break times when the Eclipse and Eclipse Plus traffic system is operating in the Program Mode. The Program Mode allows for the break windows to be set based on the programming events even when off-the-clock. Off-the-clock relates to programming which does not necessarily begin or end on the top or bottom of the hour. Sporting events are well-known off-the-clock programs because the start and end times are not on top and bottom of the hour. Moreover, extra play (e.g., overtime, extra innings, etc.) alter even a projected end time.

Currently major cable and direct broadcast satellite operators have little choice in the traffic and billing systems that support multi-zone and complex interconnected systems. There are two major platforms on which to run traffic and billing. Viable traffic and billing systems comprise Novar and Eclipse/Eclipse Plus. The current Eclipse Traffic system (which is the predominant Traffic system in use) suffers drawbacks including an inability to incorporate scheduled commercial/advertising break times in the files used to transmit the inventory allocations, break windows and break counts and break sequence especially in a preferred Program Mode. The embodiments of the present invention seek to solve the drawbacks with the current system.

Figure 3:
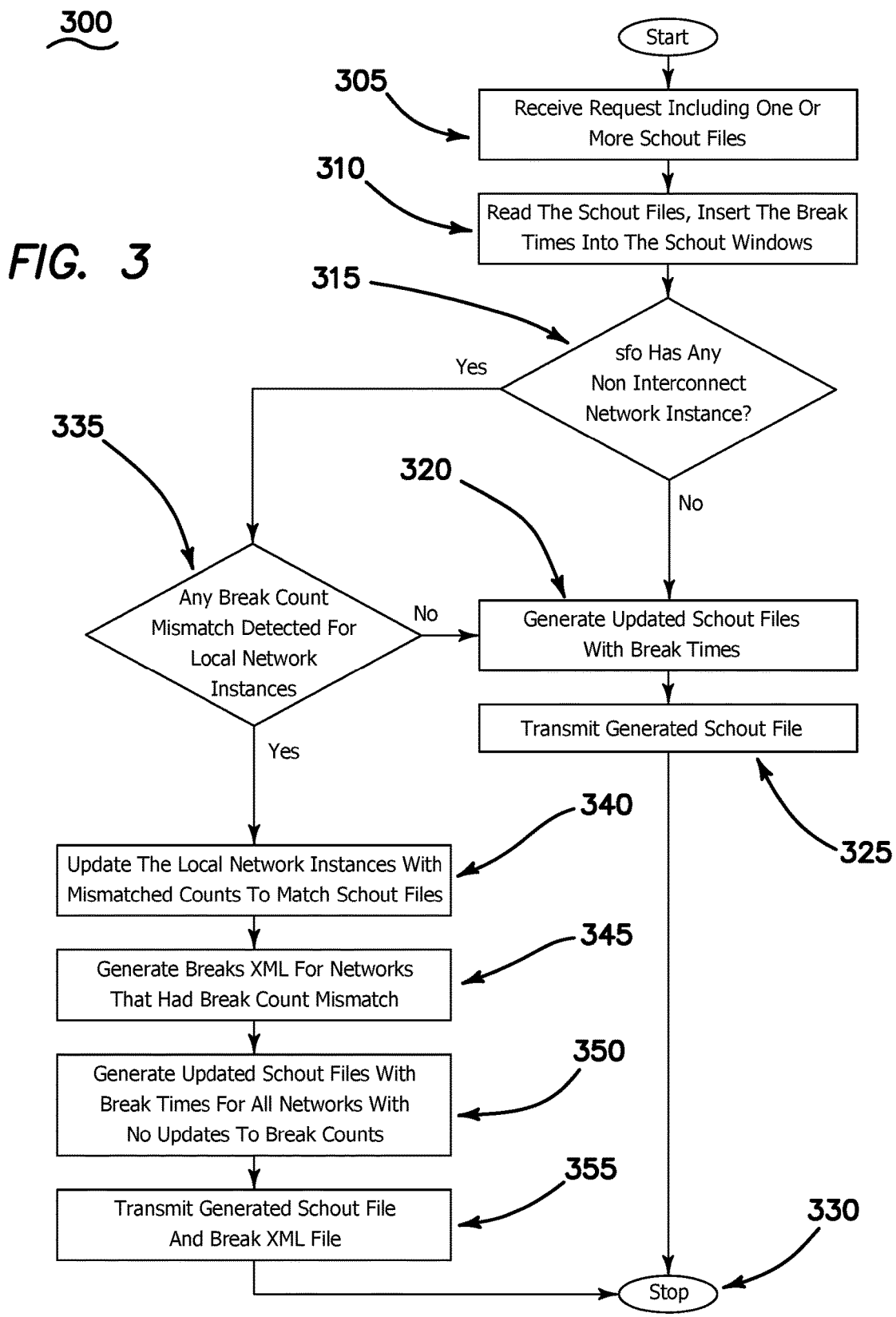
FIG. 3 illustrates a flow chart detailing an advertising placement method according to the embodiments of the present invention.

FIG. 3 illustrates a flow chart 300 detailing a methodology according to the embodiments of the present invention. At 305, a request is received. The request includes one or more Schout files that may contain inventory allocations, break windows and break counts and break sequence for a number of network instances over various time zones and/or various geographical areas. The request may be received in different ways including through digital form via a desktop, web portal or email. Once the request is received, at 310, the Schout files are read one network instance at a time and the break times are inserted within the windows included in the received Schout file with confirmation that the break times are within the windows. At 315, it is determined if the Schout file contains any local, non-interconnected network instances. If there are no local, non-interconnected network instances, at 320, an updated Schout file containing updated break times is generated for every received Schout file. At 325, the generated Schout file is transmitted to the customer. The transmission of the updated Schout file to the customer may be in the form of an attachment to an email or other digital form. At 330, the method ends. If, at 315, the received Schout file contains any local, non-interconnected network instances, at 330, every local network instance is tested for break counts to determine if any of the break counts, associated with the non-interconnected local network instances, are mismatched compared to a break structure file for each non-interconnected network instance. If there is no mismatch, at 320, an updated Schout file containing updated break times is generated for the received Schout file. At 325, the generated Schout file is transmitted to the customer as detailed above. At 330, the method ends.

If, at 330, a break count mismatch is detected, at 335, the break counts of non-interconnected local networks are updated to match the received Schout files. At 340, a break structure file is generated for the non-interconnected local networks having the break counts updated/corrected in 335. In one embodiment, the break structure file is an xml file. At 345, updated Schout files are generated for all the non-interconnected network instances not having break count mismatches. At 350, the break structure file generated at 340 and the Schout files generated at 355 are transmitted to the customer. Transmission of the break structure xml file and Schout file may be as attachments to an email. At 330, the method ends. The updated Schout files transmitted to the customers may then be sent by the customers to the appropriate traffic system (e.g., Eclipse).

Figure 4:
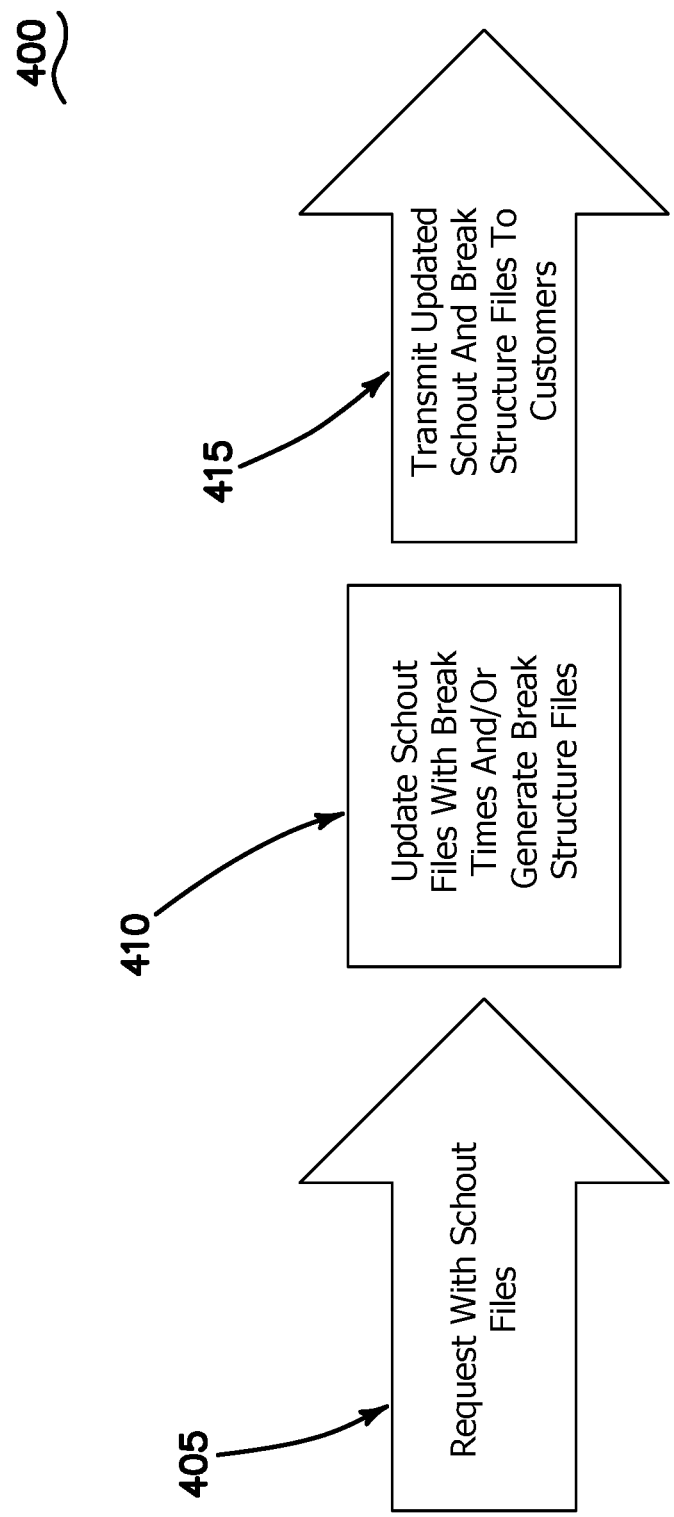
FIG. 4 illustrates a block diagram of a procedure according to the embodiments of the present invention.

FIG. 4 shows a diagram 400 highlighting the process undertaken by the embodiments of the present invention. A request 405 including Schout files is received by a computer-implemented traffic system configured to manage content including advertisements. The computer-implemented system 410 according to the embodiments of the present invention generates updated Schout files with break times and/or break structure files. The updated Schout files and/or break structure files are then transmitted to the customer (e.g., advertiser) 415. The customers may then transmit the compatible updated Schout files and/or break structure files to the traffic system.

Figure 5C:
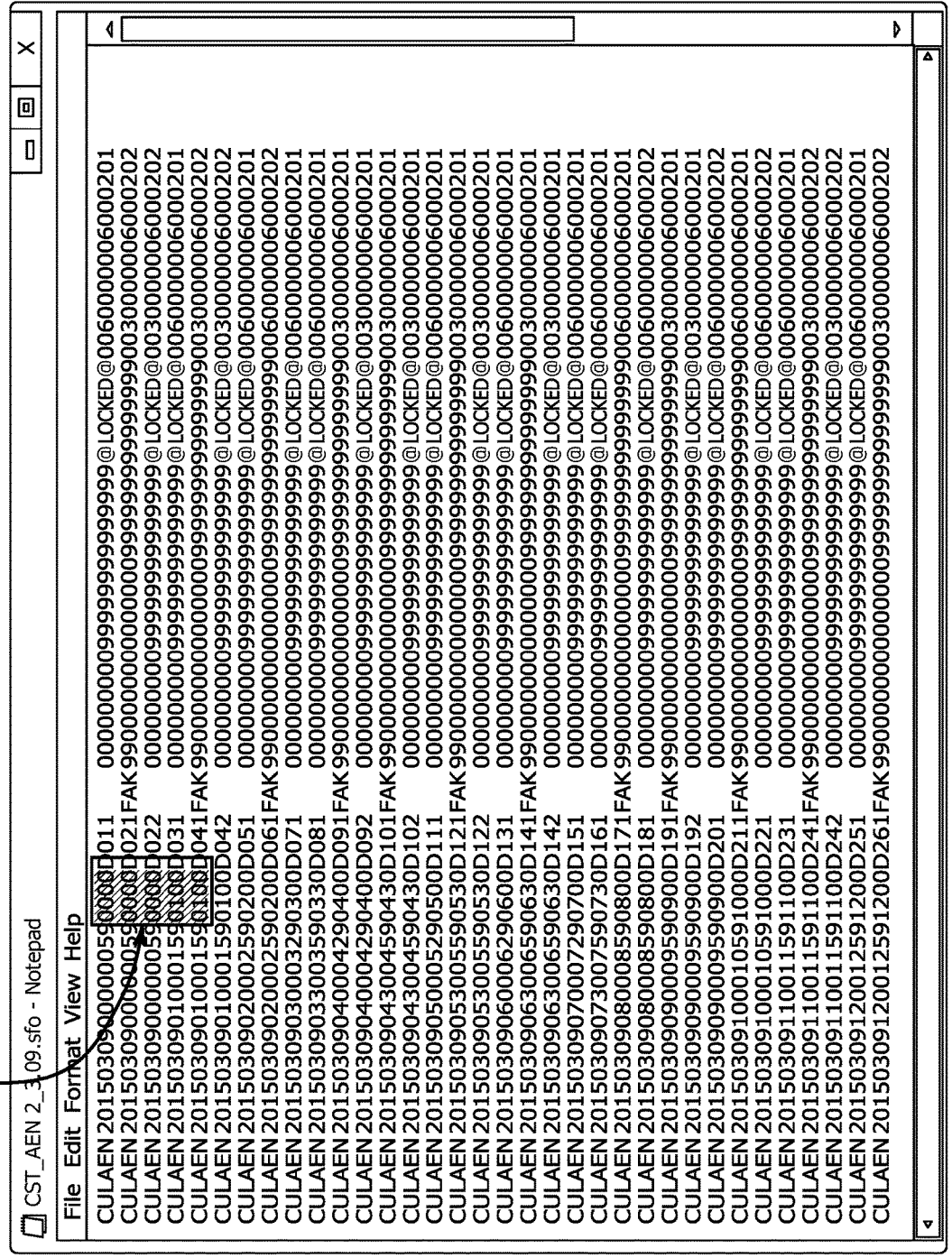

FIGS. 5A-5D show screen shots 500-503 associated with a methodology according to the embodiments of the present invention. Screen shots 500-503 relate to the Eclipse operating system. FIG. 5A shows screen shot 500 depicting a time-based Schout file preview having break times 505 defaulted to the break windows. That is, the start of the break times 505 correspond to the start of the open times of the break windows. As shown in screen shot 501 of FIG. 5B, the more popular Program Mode Schout file preview is based on program windows. In the Program Mode, the break windows may be set based on the programming. However, in the Program Mode, instead of pulling the break time, the operating system inserts the window start time as the break time 510. Once the file is imported into the operating system (e.g., Eclipse), the system creates its own break times. FIG. 5C shows an exemplary Schout file exported using program windows including the location where the break time 515 should appear, but instead the operating system inserts the window start time, namely at the zero minute (0:00) and one hour (1:00) marks. FIG. 5D shows an updated exemplary Schout file with break times 520 inserted at the 15 minute (0:15), 45 minute (0:45), one hour fifteen minute (1:15) and one hour forty five minute (1:45) marks. The system and method herein causes the exported Schout file to be manipulated such that the break times are correctly placed in lieu of the window start times. The updated Schout file may then be transmitted to the customer. The customer may then send the updated Schout file to the traffic system provider since the Schout file is compatible with the operating system utilized by the traffic systems.

While Schout files are the norm in the television broadcast industry, it is conceivable that other file forms may utilize the embodiments of the present invention.

Although the invention has been described in detail with reference to several embodiments, additional variations and modifications exist within the scope and spirit of the invention as described and defined in the following claims.

We claim:

1. A computer system for incorporating advertising breaks across one or more broadcast networks comprising:
   a processor, said processor being a hardware component of the computer system; and memory in communication with said processor, said memory storing a plurality of instructions which when executed by said processor cause said processor to:
   read an electronic request having one or files in a pre-established file type, said one or more files including at least program window times;
   insert break times into said program window times of said one or more files;
   determine if said one or more files involve non-interconnected local network instances; and if said one or more files do not involve non-interconnected local network instances, update said one or more files with break times inserted into said program window times; and if said one or more files do involve non-interconnected local network instances, determine if any break counts associated with said non-interconnected local network instances are mismatched compared to said one or more files; and if no break counts associated with said non-interconnected local network instances are mismatched compared to said one or more files, insert break times into said program window times of said one or more files; and if any break counts associated with said non-interconnected local network instances are mismatched compared to said one or more files, (i) update break counts of non-interconnected local networks to match said one or more files; (ii) generate break structure files for said non-interconnected local networks having mismatched break counts; and (iii) update said one or more files for all said non-interconnected network instances not having break count mismatches.

2. The computer system of claim 1 wherein said instructions, which when executed by said processor, further cause said processor to: transmit said updated one or more files and/or break structure files to desired recipients.

3. The computer system of claim 2 wherein said transmitted updated one or more files and/or break structure files are sent as email attachments to desired recipients.

4. The computer system of claim 1 wherein said electronic request having one or more files is received as an attachment to an email.

5. The computer system of claim 1 wherein said pre-established file type is Schout.

6. The computer system of claim 1 wherein said one or more files may contain inventory allocations, break windows and break counts and break sequence for a number of network instances over various time zones and/or various geographical areas.

7. A non-transitory computer readable medium with program instructions tangibly stored thereon for incorporating advertising breaks across one or more broadcast networks, the program instructions comprising instructions for:
   reading an electronic request having one or files in a pre-established file type, said one or more files including at least program window times;

inserting break times into said program window times of said one or more files; determining if said one or more files involve non-interconnected local network instances; and if said one or more files do not involve non-interconnected local network instances, updating said one or more files with break times inserted into said program window times; and if said one or more files do involve non-interconnected local network instances, determining if any break counts associated with said non-interconnected local network instances are mismatched compared to said one or more files; and if no break counts associated with said non-interconnected local network instances are mismatched compared to said one or more files, inserting break times into said program window times of said one or more files; and if any break counts associated with said non-interconnected local network instances are mismatched compared to said one or more files, (i) updating break counts of non-interconnected local networks to match said one or more files; (ii) generating break structure files for said non-interconnected local networks having mismatched break counts; and (iii) updating said one or more files for all said non-interconnected network instances not having break count mismatches.

8. The non-transitory computer readable medium of claim 7 further comprising program instructions for transmitting said updated one or more files and/or break structure files to desired recipients.

9. The non-transitory computer readable medium of claim 7 further comprising program instructions for transmitting said updated one or more files and/or break structure files as email attachments to desired recipients.

10. The non-transitory computer readable medium of claim 7 further comprising program instructions for receiving said electronic request having one or more files as an attachment to an email.

11. The non-transitory computer readable medium of claim 7 further comprising program instructions for receiving one or more files of Schout type.

12. The non-transitory computer readable medium of claim 7 further comprising program instructions for receiving said one or more files containing inventory allocations, break windows and break counts and break sequence for a number of network instances over various time zones and/or various geographical areas.

13. A computer-implemented method for incorporating advertising breaks across one or more broadcast networks, the method comprising: utilizing a processor, said processor being a hardware component of the computer system; and memory in communication with said processor, said memory storing a plurality of instructions executable by said processor:
    reading an electronic request having one or files in a pre-established file type, said one or more files including at least program window times;
    inserting break times into said program window times of said one or more files; determining if said one or more files involve non-interconnected local network instances; and if said one or more files do not involve non-interconnected local network instances, updating said one or more files with break times inserted into said program window times; and if said one or more files do involve non-interconnected local network instances, determining if any break counts associated with said non-interconnected local network instances are mismatched compared to said one or more files; and if no break counts associated with said non-interconnected local network instances are mismatched compared to said one or more files, inserting break times into said program window times of said one or more files; and if any break counts associated with said non-interconnected local network instances are mismatched compared to said one or more files, (i) updating break counts of non-interconnected local networks to match said one or more files; (ii) generating break structure files for said non-interconnected local networks having mismatched break counts; and (iii) updating said one or more files for all said non-interconnected network instances not having break count mismatches.

14. The method of claim 13 further comprising transmitting said updated one or more files and/or break structure files to desired recipients.

15. The method of claim 13 further comprising transmitting said updated one or more files and/or break structure files as email attachments to desired recipients.

16. The method of claim 13 further comprising receiving said electronic request having one or more files as an attachment to an email.

17. The method of claim 13 further comprising receiving said one or more files in Schout form.

18. The method of claim 13 further comprising receiving said one or more files containing inventory allocations, break windows and break counts and break sequence for a number of network instances over various time zones and/or various geographical areas.

* * * * *